US012102047B2

United States Patent
Venderbosch

(10) Patent No.: US 12,102,047 B2
(45) Date of Patent: Oct. 1, 2024

(54) SPACING AND/OR VENTILATION CONDITIONS IN THE CULTIVATION ENVIRONMENT OF PLANTS

(71) Applicant: Soli Organic Inc., Harrisonburg, VA (US)

(72) Inventor: Antonius Henricus Jacobus Venderbosch, Groenlo (NL)

(73) Assignee: Soli Organic Inc., Harrisonburg, VA (US)

( * ) Notice: Subject to any disclaimer, the term of this patent is extended or adjusted under 35 U.S.C. 154(b) by 176 days.

(21) Appl. No.: 17/471,021

(22) Filed: Sep. 9, 2021

(65) Prior Publication Data
US 2022/0071103 A1    Mar. 10, 2022

(30) Foreign Application Priority Data
Sep. 9, 2020  (NL) ..................... 2026433

(51) Int. Cl.
*A01G 9/02*    (2018.01)
*A01G 9/04*    (2006.01)

(52) U.S. Cl.
CPC .............. *A01G 9/027* (2013.01); *A01G 9/045* (2013.01)

(58) Field of Classification Search
CPC .......... A01G 9/045; A01G 9/042; A01G 9/02; A01G 9/027; A01G 9/028; A01G 9/0295; A01G 9/0297
See application file for complete search history.

(56) References Cited

U.S. PATENT DOCUMENTS

| 5,315,786 A * | 5/1994 | Smith ................... A01G 23/02 47/74 |
| 6,029,399 A | 2/2000 | Mercer |
| 2009/0119987 A1* | 5/2009 | Ingrassia ................. A01K 9/02 47/66.5 |
| 2015/0047258 A1 | 2/2015 | Lewis et al. |

(Continued)

FOREIGN PATENT DOCUMENTS

| WO | 9105461 A1 | 5/1991 |
| WO | 2017183969 A1 | 10/2017 |

OTHER PUBLICATIONS

International Search Report and Written Opinion dated Jan. 31, 2022 for PCT Application No. PCT/US2021/049258, 13 pages.

*Primary Examiner* — Joshua J Michener
*Assistant Examiner* — Henry Hooper Mudd
(74) *Attorney, Agent, or Firm* — Benesch Friedlander Coplan & Aronoff LLP

(57) ABSTRACT

A method of increasing interspace among plant containers. The method comprises: providing a set of plant containers, the set comprising first and second plant containers; arranging the first plant containers in a first structured grid formation along a horizontal plane; and arranging the second plant containers in a second structured grid formation along said horizontal plane, whereby when viewed from above the first and second plant containers are alternatingly arranged in a joint structured grid formation in a first area. The method comprises, for increasing the interspace among the plant containers, mutually simultaneously moving the second plant containers in their second grid formation away from the first plant containers in a vertical direction and subsequently placing the second plant containers in a second area.

19 Claims, 4 Drawing Sheets

(56) References Cited

U.S. PATENT DOCUMENTS

| | | |
|---|---|---|
| 2015/0201551 A1 | 7/2015 | Ohara et al. |
| 2018/0303040 A1* | 10/2018 | Proulx ..................... A01G 9/02 |
| 2019/0141923 A1 | 5/2019 | Ray, Jr. |
| 2020/0163283 A1* | 5/2020 | Aminpour ................ A01G 9/02 |
| 2020/0187427 A1* | 6/2020 | Brault ...................... A01G 9/02 |
| 2021/0274723 A1* | 9/2021 | Lee ......................... A01G 9/02 |

* cited by examiner

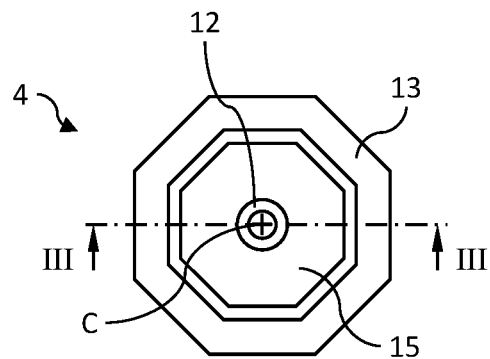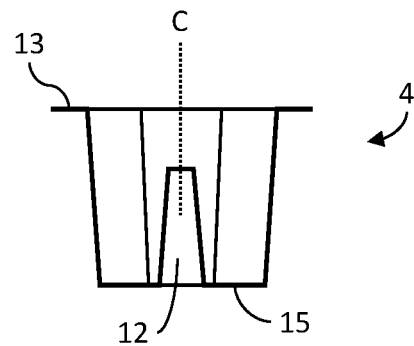
Fig. 3A   Fig. 3B
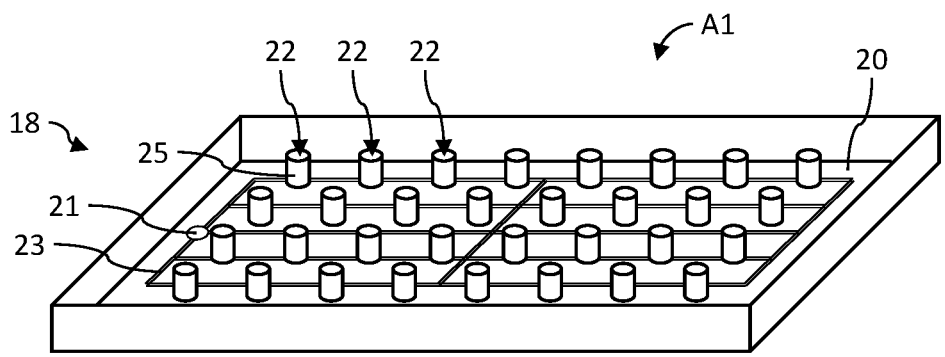
Fig. 4
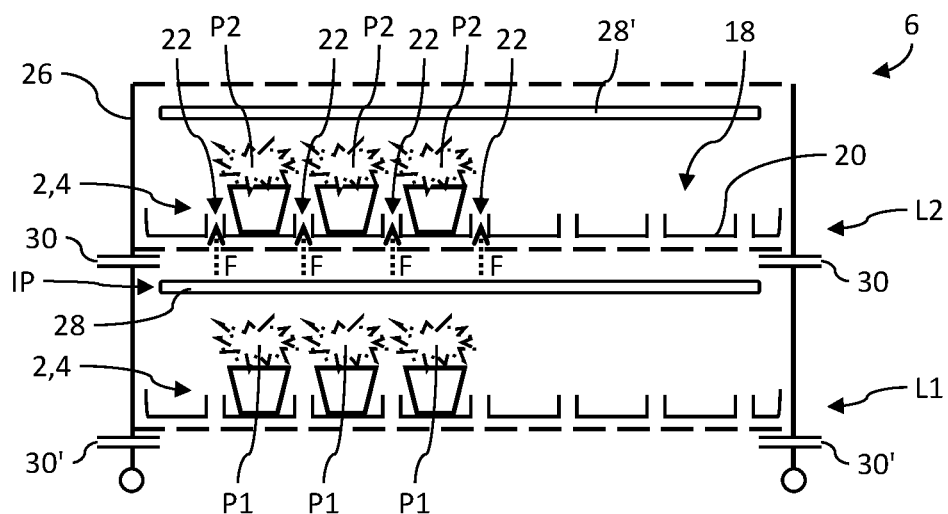
Fig. 5

SPACING AND/OR VENTILATION CONDITIONS IN THE CULTIVATION ENVIRONMENT OF PLANTS

CROSS-REFERENCE TO RELATED APPLICATIONS

This disclosure claims priority to and the benefit from Dutch Provisional Patent Application No. N2026433, titled "Improving Space and/or Ventilation Conditions in the Cultivation Environment of Plants," filed on Sep. 9, 2020, which is herein incorporated by reference in its entirety.

FIELD

The invention concerns a method of increasing interspace among plant containers, a plant container assembly, systems, and methods for cultivating plants, and a plant cultivated thereby.

BACKGROUND

Cultivation of plants, e.g. for consumption or decoration, has been known since prehistoric times. More recently, so-called vertical farming methods have been developed in which plants are cultivated above each other on multiple vertical levels, providing particularly efficient cultivation and high yields per surface area of land. Such plants are generally cultivated in plant containers, for example individual containers, which are placed on a support structure which provides the multiple vertical levels. A set of mutually connected plant containers can be placed in a tray on the support structure for easier combined handling of multiple containers. In vertical farming, growing conditions for the plants are generally influenced by controlled and/or active means, e.g. for influencing irrigation, drainage, nutrition, light, temperature, humidity and atmospheric composition.

As farmers strive to increase their plant production per area, properly managing the growing conditions for the plants becomes increasingly challenging. Plants are generally positioned closely together, so that a relatively dense foliage is formed among the plants, in particular becoming denser as the plants grow. Such a dense foliage has been found to inhibit good control of several growing conditions, such as light, temperature, humidity and atmospheric composition. The dense foliage in particular inhibits good ventilation flows for the plants as the foliage effectively forms a barrier layer which deflects and/or dampens such flows. A boundary layer of relatively calm air surrounding leaves of the plants can thereby thicken to a level which disadvantageously inhibits exchange of gasses, water and energy between the leaves and their environment. Also, the dense foliage can cause excessive mutual shading among neighboring plants, further negatively affecting plant health and growth.

A known solution to remedy such adverse effects of dense foliage is to space the plant containers with the plants further apart as the plants grow, aiming to adjust the interspace among the plants so as to allow e.g. ventilation flows and light to properly reach the plant leaves. However, such adjustments generally involve extensive manual labor, requiring workers to manually move individual plants from one area to another. As a result, this solution does not scale well and thus negatively affects the overall efficiency of the plant cultivation. Some automated solutions for increasing interspace among plant containers have been developed, however these require complex logistics with large machines and conveyor systems.

Thus, there is a need for further improvement in plant cultivation.

SUMMARY

An object of the invention is to provide improved plant cultivation, wherein in particular the cultivation can be more efficient per unit of area and/or per unit of time, and/or wherein higher quality plants can be produced. An object is to enable better growing conditions for plants in vertical farming. An object is to make vertical farming more efficient and/or easier. An object is to at least partly solve at least one of the above-mentioned problems or a related problem. An object is to at least provide an alternative.

To that end a first aspect of the invention, which aspect can advantageously be combined with one or more other aspects, provides a method of increasing interspace among plant containers. The method according to the first aspect comprises providing a set of plant containers, the set comprising first and second plant containers. The method according to the first aspect comprises: arranging the first plant containers in a first structured grid formation along a horizontal plane; and arranging the second plant containers in a second structured grid formation along said horizontal plane, whereby when viewed from above the first and second plant containers are alternatingly arranged in a joint structured grid formation in a first area. The method according to the first aspect comprises, for increasing the interspace among the plant containers, mutually simultaneously moving the second plant containers in their second grid formation away from the first plant containers in a vertical direction and subsequently placing the second plant containers in a second area.

By thus moving the second plant containers away from the first plant containers, interspace among a relatively large number of plant containers can advantageously be increased, in particular relatively quickly and with relatively little effort. In this way the combined foliage of the plants in the containers can easily be made less dense when needed, so that growing conditions for the plants can advantageously be well controlled throughout subsequent stages of plant growth.

The first plant containers on the one hand and the second plant containers on the other hand can be substantially indistinguishable from each other and/or interchangeable with each other when jointly arranged in the joint structured grid formation. Thus, in practice for example the second plant containers can be designated as second plant containers only upon moving the second plant containers away from the first plant containers. The second plant containers can be connected to each other, e.g. selectively connected to each other, as explained further elsewhere in this description. Alternatively, one or more of the second plant containers can be disconnected from one or more other second plant containers. In the joint structured grid formation the first and second plant containers can be in contact with each other or spaced apart from each other.

In the context of the present disclosure a structured grid formation can be interpreted as a formation in which the respective plant containers are positioned at respective vertices or cell centers of a so-called structured grid, in particular a two-dimensional or planar structured grid which extends in the horizontal plane. Examples of structured grids include a square grid, a rectangular grid, a parallelogram grid, a triangular grid and a hexagonal grid. A structured grid can be a regular grid. A grid in this sense is sometimes also called a mesh or a lattice. It will be appreciated that no physical grid or mesh or lattice is required for plant containers to be arranged in a structured grid formation.

Preferably, the first, second and joint structured grid formations each extend in two dimensions along the horizontal plane, e.g. comprising at least two rows of plant containers. Alternatively, for example the first or the second structured grid formation can form a single row of plant containers.

The second area and the first area preferably do not overlap each other. For example, the second area can be to the side of and/or above and/or below the first area.

The number of second plant containers can be about the same as the number of first plant containers, or a different number. Depending on the grid formations, plants in the plant containers can for example be spaced about twice further apart, or less or more further apart. Interspace among plants can e.g. be measured between stems of the plants. Interspace among plant containers can e.g. be measured between sides and/or centers of the plant containers. Increasing interspace can comprise introducing initial interspace, i.e. increasing from zero or substantially zero interspace.

In the context of the present disclosure, arranging plant containers along a horizontal plane can be interpreted as arranging the plant containers substantially next to each other with downward facing bottoms, upward facing openings and mutually facing sides. The plant containers can be arranged on exactly the same vertical level, but this is not strictly necessary. Alternatively, one or more plant containers are arranged somewhat higher than one or more other plant containers, e.g. with some level differences among bottoms of the plant containers and/or with somewhat different heights of the containers themselves. One or more of the plant containers can be somewhat tilted, e.g. having a bottom which extends in a plane that is somewhat inclined compared to a perfectly horizontal plane.

In the context of the present disclosure, moving plant containers in a vertical direction does not exclude that plant containers are simultaneously moved in a horizontal direction. However, in the method according to the first aspect the second plant containers are preferably moved in the vertical direction substantially without simultaneous horizontal movement of the second plant containers with respect to the first plant containers.

A second aspect of the invention, which aspect can advantageously be combined with one or more other aspects, provides a method of cultivating plants. The method according to the second aspect comprises: providing plant containers with cultivatable plant material therein; and increasing interspace among the plant containers according to the first aspect, in particular after a first period of growth of plants in the containers to facilitate further growth of the plants in the containers during a subsequent period of growth.

Such a method provides above-mentioned advantages.

Cultivatable plant material can comprise one or more of a plant, a seed, a bulb, and a spore, for example. The plant containers can further be provided with a growing medium therein, for example comprising soil or a soil-free growing medium.

A third aspect of the invention, which aspect can advantageously be combined with one or more other aspects, provides a system for cultivating plants. The system according to the third aspect comprises a set of plant containers which are each suitable for cultivating one or more plants therein, the set comprising first and second plant containers.

The first plant containers are configured to be arranged in a first structured grid formation along a horizontal plane and the second plant containers are configured to be arranged in a second structured grid formation along said horizontal plane, such that when viewed from above the first and second plant containers are alternatingly arranged in a joint structured grid formation. The first and second plant containers are configured to enable mutually simultaneous vertical movement between the first plant containers on the one hand and the second plant containers on the other hand. The system according to the third aspect comprises a separation device configured for mutually simultaneously moving the second plant containers away from the first plant containers in a vertical direction such that the second plant containers in their second structured grid formation are subsequently placeable in a second area while the first plant containers can remain in their first structured grid formation in a first area, whereby interspace among the plant containers is increased.

It will be appreciated that the first plant containers need not necessarily remain in the first area. For example, the first plant containers can be moved away from the first area shortly after or even during the placement of the second plant containers in the second area.

Such a system provides above-mentioned advantages, in particular by enabling a method according to the first aspect. The separation device can be realized in various ways, as will be elaborated in the detailed description. In the system according to the third aspect optionally the second plant containers are connected or connectable to each other, e.g. forming a single unit, but this is not strictly necessary.

A fourth aspect of the invention, which aspect can advantageously be combined with one or more other aspects, provides a plant container assembly comprising second plant containers which are each suitable for cultivating one or more plants therein and which are mutually connected in a second structured grid formation with regular interspacing among the second plant containers. Herein the interspacing is dimensioned to reversibly receive therein first plant containers in a vertical direction, which first plant containers are each suitable for cultivating one or more plants therein and are mutually arranged in a first structured grid formation. The assembly is configured such that by said receiving the first and second plant containers are alternatingly arranged in a joint structured grid along a horizontal plane.

Such an assembly provides above-mentioned advantages. In particular the mutually connected plant containers enable relatively easy execution of the method according to the first aspect.

A fifth aspect of the invention, which aspect can advantageously be combined with one or more other aspects, provides a system for cultivating plants. The system according to the fifth aspect comprises a support structure for supporting plant containers on multiple vertical levels above each other. The multiple vertical levels comprise a first vertical level and a second vertical level above the first vertical level. The support structure is configured to allow an upward flow of gas within outer bounds of the support structure from the first vertical level to the second vertical level. The system according to the fifth aspect comprises a heat generating light source arranged within the outer bounds between the first and second vertical levels. The light source is configured to illuminate plants on at least the first vertical level. The system according to the fifth aspect is configured to allow gas at the light source to be heated by the light source such that by convection the heated gas is subsequently driven upward to the second vertical level, the gas thereby forming a ventilation flow for plants which are arranged at the second vertical level.

Such a system can advantageously promote good growing conditions for plants, in particular in vertical farming environments. The upward flow of gas can advantageously influence, in particular ventilate, plants on the second vertical level, wherein such gas can flow from below the second vertical level upward between the plant containers on the second vertical level and further upward along and/or through the respective plant foliage. It has been found that good plant ventilation can thus be provided in spite of a relatively dense foliage. In particular a boundary layer surrounding leaves of the plants can thus be managed well, preventing an excessively thick boundary layer and promoting good conditions at the boundary layer. Such a ventilation flow can influence various conditions including gas composition (e.g. CO2-concentration), temperature and humidity.

By thus employing a heat generating light source for two purposes simultaneously, i.e. providing light for one set of plants and providing ventilation for another set of plants, plant cultivation is made more efficient. Many commonly used light sources, including LEDs, generate heat as result of imperfect conversion of electric energy to light. Instead of being wasted, this heat can thus advantageously drive improved plant ventilation. The same heat can also advantageously contribute to good temperature regulation, in particular for the plants at the second vertical level and possibly at further levels above the second vertical level.

A sixth aspect of the invention, which aspect can advantageously be combined with one or more other aspects, provides a method of cultivating plants. The method according to the sixth aspect comprises: cultivating a first plant on a first vertical level; and cultivating a second plant above the first plant on a second vertical level. The method according to the sixth aspect comprises: providing a heat generating light source at an intermediate position which is beneath the second plant and above and/or to the side of the first plant; and illuminating the first plant using the heat generating light source, thereby heating a gas at the intermediate position. The method according to the sixth aspect comprises allowing the heated gas to rise to the second vertical level and upwardly along the second plant by convection, thereby ventilating the second plant.

Such a method provides advantages mentioned above with respect to the system according to the fifth aspect. Such a method can for example be performed using such a system.

Preferably the first plant and the second plant are each cultivated in a respective plant container which is arranged on the respective vertical level.

A further aspect of the invention provides a plant cultivated by a method according to the second and/or sixth aspect, and/or using a system according to the third and/or fifth aspect, and/or in a plant container of an assembly according to the fourth aspect.

Such a plant can benefit from above-mentioned advantages, thus e.g. being relatively efficient to cultivate and/or being of relatively good quality, in particular for consumption and/or decoration.

Further advantageous elaborations of the invention are provided by the features of the dependent claims, as will be explained further in the following detailed description.

BRIEF DESCRIPTION OF DRAWINGS

In the following, the invention will be explained further using exemplary embodiments and drawings. The drawings are schematic and merely show examples. In the drawings, corresponding elements have been provided with corresponding reference signs. In the drawings:

FIG. 3A shows a top view of an exemplary plant container;

FIG. 3B shows a cross sectional view of the plant container of FIG. 3A along the line III-III in FIG. 3A;

FIG. 4 shows an isometric view of an exemplary tray for receiving plant containers thereon;

FIG. 5 shows a cross sectional side view of an exemplary support structure for supporting plant containers on multiple vertical levels, wherein a heat generating light source and gas supply means have been provided;

DETAILED DESCRIPTION

Figure 1A:
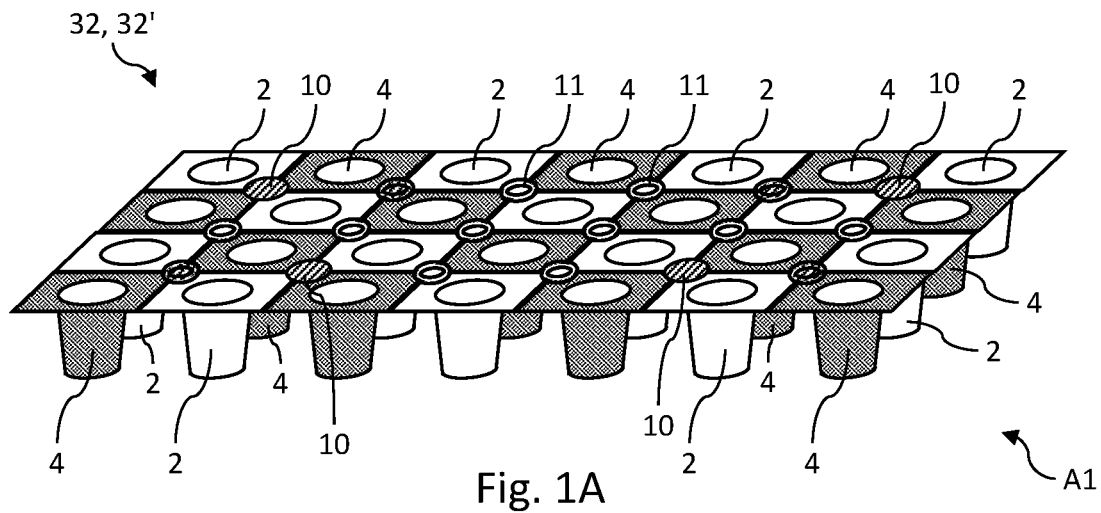
FIG. 1A shows an isometric view of an exemplary set of plant containers in a joint structured grid formation, the set comprising first and second plant containers.

An exemplary method of increasing interspace among plant containers 2, 4, is illustrated in FIGS. 1A-B and 2A-C. The method comprises providing a set of plant containers 2, 4, the set comprising first plant containers 2 and second plant containers 4.

In FIGS. 1A-B and 2A-C for clarity of the drawing the first plant containers 2 are shown without hatching while the second plant containers 4 are shown with hatching. It will be appreciated that in practice the first and second plant containers 2, 4 may be of the same color. In these drawings fourteen first plant containers 2 and fourteen second plant containers 4 are shown, only some of which have been provided with a respective reference sign 2 or 4. It will be appreciated that different numbers of plant containers may be used and that the number of second plant containers 4 may be different from the number of first plant containers 2. See FIGS. 6A-B for one alternative.

The method comprises arranging the first plant containers 2 in a first structured grid formation along a horizontal plane; and arranging the second plant containers 4 in a second structured grid formation along said horizontal plane (see FIGS. 1A and 2A), whereby when viewed from above (see FIG. 1A) the first and second plant containers 2, 4 are alternatingly arranged in a joint structured grid formation in a first area A1.

The method comprises, for increasing the interspace among the plant containers 2, 4, mutually simultaneously moving the second plant containers 4 in their second grid formation away from the first plant containers 2 in a vertical direction V (see FIG. 1B) and subsequently placing the second plant containers 4 in a second area A2 (see FIG. 2B).

Figure 1B:
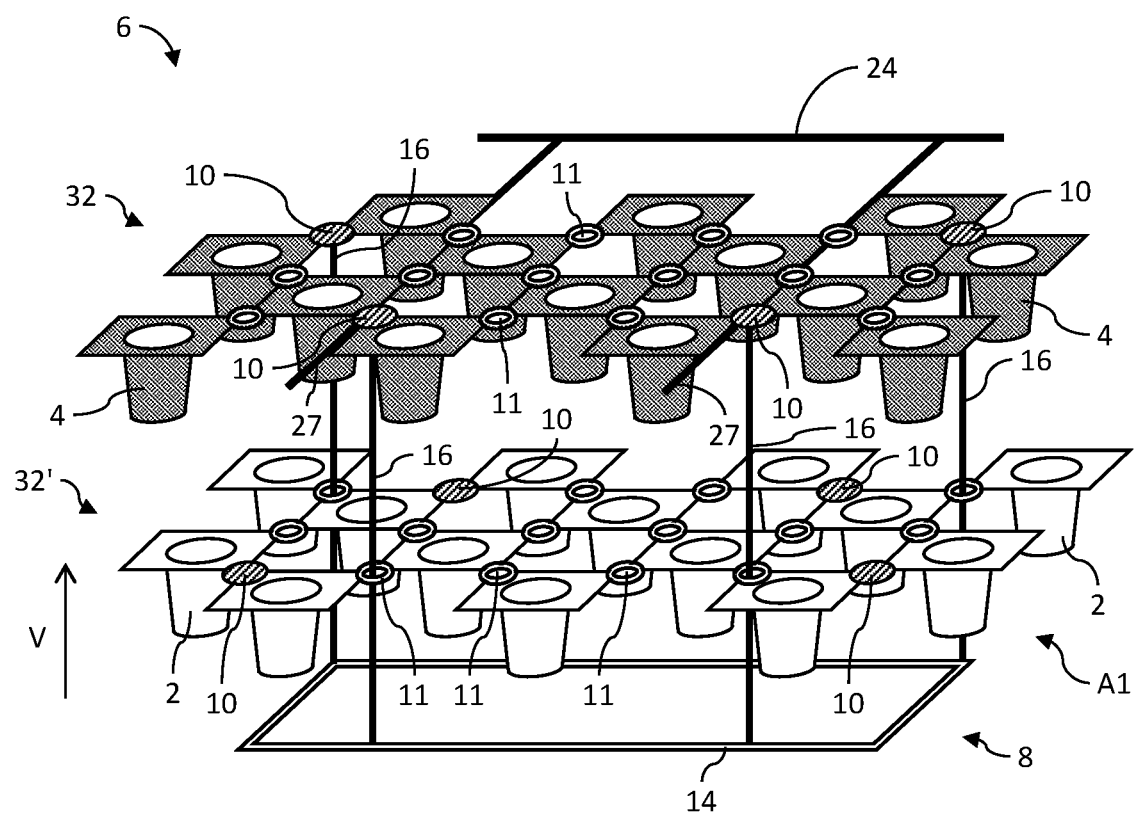
FIG. 1B shows an isometric view of an exemplary system which comprises the set of plant containers of FIG. 1A, wherein the second plant containers have been moved away from the first plant containers in a vertical direction using a separation device of the system.

While in FIG. 1B the second plant containers 4 are shown vertically substantially spaced apart from the first plant containers 2, the second plant containers 4 may alternatively be positioned closer to the first plant containers 2 when viewed from a side, after moving the second plant containers 4 away from the first plant containers 2, in particular depending on a size of plants contained in the first plant containers 2. As can be seen in FIG. 1B, the moving away preferably enables subsequent horizontal translation of the second plant containers 4 in their second structured grid formation with respect to the first plant containers 2 in their first structured grid formation. Thus, the moving away in the vertical direction V is preferably such that the second plant containers 4 subsequently do not overlap the first plant containers 2, nor plants contained therein, when viewed from a side.

The second area A2 preferably does not overlap the first area A1, however partial overlap between said areas A1, A2 is possible. In the example of FIG. 2B the second area A2 is immediately adjacent to the first area A1, however the second area A2 may be further away from the first area A1. Here the second area A2 extends in the same plane as the first area A2, however the second area A2 may extend in a different plane from the first area A1, e.g. on a different vertical level. Here the first and second plant containers 2, 4 in the first and second areas A1, A2 advantageously form a continuous structured grid formation, however this is not strictly necessary.

Placing the second plant containers 4 in a second area may comprise translating and/or rotating the second plant containers 4 in their second structured grid formation with respect to the first plant containers 2. Here the vertical direction V is an upward direction, however the vertical direction may be a downward direction.

While the second plant containers 4 are moved away from the first plant containers 2 in the vertical direction V, the first plant containers 2 here remain stationary in the first area A1. Alternatively, the first plant containers 2 can be mobile during some or all of this time, e.g. being moved vertically at a different speed and/or in a different direction compared to the second plant containers 4. The first and/or second plant containers 2, 4 can alternatively or additionally be moved horizontally, e.g. on a conveyor or a vehicle, while the second plant containers 4 are moved away from the first plant containers 2 in the vertical direction V. The first area A1 and/or the second area A2 can be a mobile area, e.g. being located on a conveyor and/or on a vehicle.

Figure 2A:
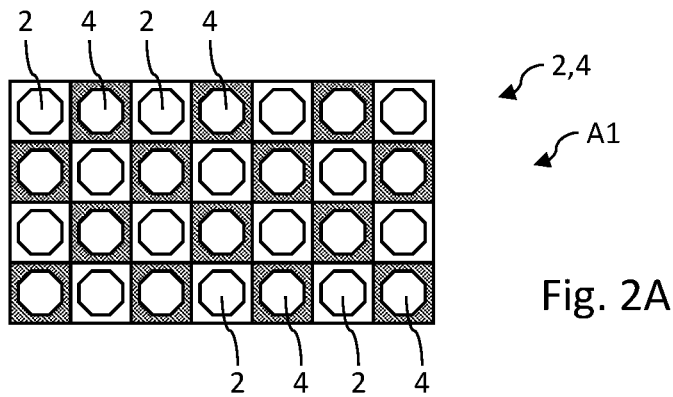
FIG. 2A shows a top view of an exemplary set of plant containers in a joint structured grid formation, the set comprising first and second plant containers.
Figure 2B:
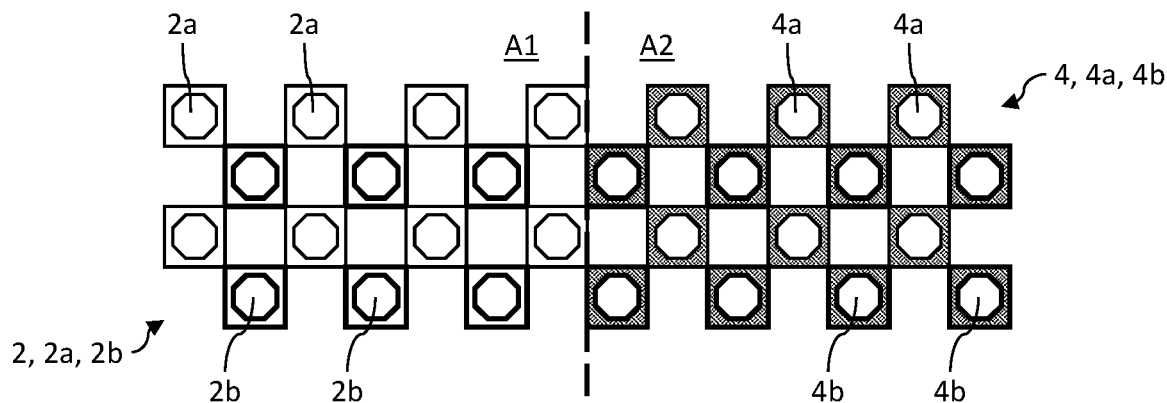
FIG. 2B shows a top view of the set of plant containers of FIG. 2A, wherein interspace among the plant containers has been increased compared to FIG. 2A.
Figure 2C:
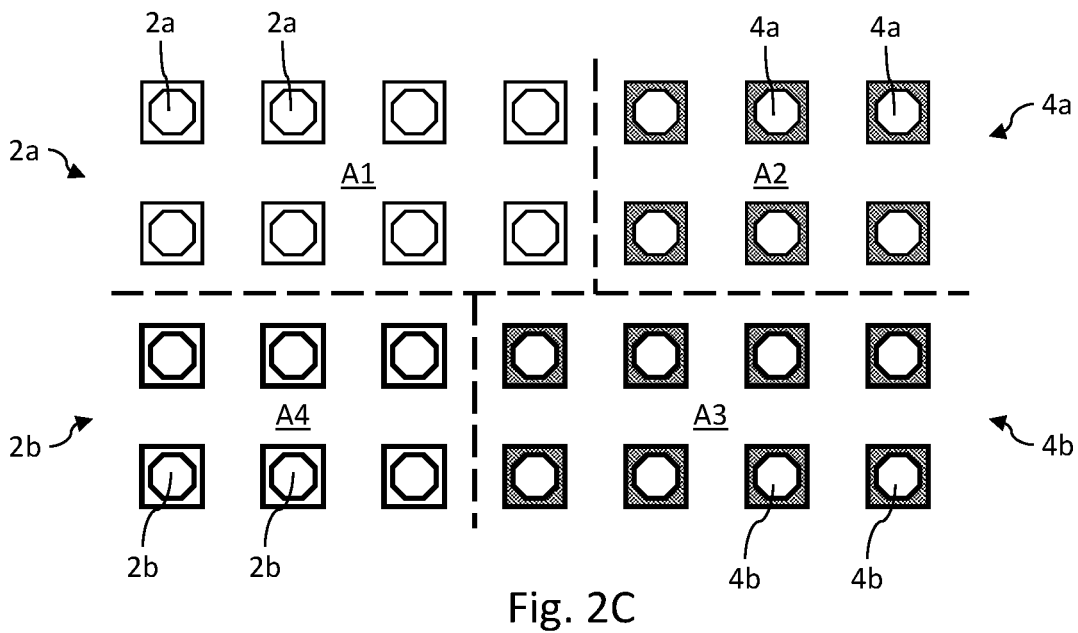
FIG. 2C shows a top view of the set of plant containers of FIG. 2B wherein interspace among the plant containers has been increased further compared to FIG. 2B.

Optionally, with reference to FIGS. 2B-C, upon placing the second plant containers 4 in the second area A2, the second plant containers 4 are together redesignated as a set of plant containers 4a, 4b which set comprises respective first 4a and second 4b plant containers which are arranged in respective first and second structured grids along a common horizontal plane, wherein when viewed from above the respective first 4a and second 4b plant containers are alternatingly arranged in a joint structured grid formation in a respective first area A2. Herein, for further increasing the interspace among the plant containers 2, 4a, 4b, the method comprises mutually simultaneously moving the respective second plant containers 4b in their respective second grid formation away from the respective first plant containers 4a in a vertical direction V and subsequently placing the respective second plant containers 4b in a respective second area, here a third area A3 (see FIG. 2C).

Optionally, with continued reference to FIGS. 2B-C, upon placing the second plant containers 4 in the second area A2, the first plant containers 2 are together redesignated as a set of plant containers 2a, 2b which set comprises respective first 2a and second 2b plant containers which are arranged in respective first and second structured grids along a common horizontal plane, wherein when viewed from above the respective first 2a and second 2b plant containers are alternatingly arranged in a joint structured grid formation in a respective first area A1. Herein, for further increasing the interspace among the plant containers 2a, 2b, 4, the method comprises mutually simultaneously moving the respective second plant containers 2b in their respective second grid formation away from the respective first plant containers 2a in a vertical direction V and subsequently placing the respective second plant containers 2b in a respective second area, here a fourth area A4 (see FIG. 2C).

In FIGS. 2B-C, for clarity of the drawing, the respective second plant containers 2b, 4b have been drawn with thicker lines compared to the respective first plant containers 2a, 4a. In this way the method as described above of increasing interspace among the set of first and second plant containers 2, 4 can essentially subsequently be repeated for further increasing interspace. It will be appreciated that the method can thus be repeated essentially over and over again, for example until a desired interspace among the plant containers has been reached. In the example of FIG. 2C interspace has been further increased among both the first 2 and second 4 plant containers, however alternatively only interspace among the first plant containers 2 or only interspace among the second plant containers 4 is thus further increased. Further increasing the interspace among the second plant containers 4 may be simultaneous with further increasing the interspace among the first plant containers 2, however alternatively such further increasing is performed at mutually different times, e.g. one shortly after the other in subsequent workflow steps and/or one several hours, days or weeks after the other depending on growth stages of plants in the containers.

In FIGS. 1A and 2A the joint structured grid formation of the first and second plant containers 2, 4 can be seen to correspond to a checkerboard-like pattern, wherein e.g. the first structured grid formation corresponds to light-colored cells of the checkerboard and the second structured grid formation corresponds to dark-colored cells of the checkerboard. The structured grid formation here thus corresponds to a square grid. However different structured grid formations are possible, possibly but not necessarily in relation to an outer shape of the plant containers 2, 4 when viewed from above. Also, the second structured grid formation can show a different, e.g. more dense or less dense, structured pattern compared to the first structured grid formation.

Figure 6A:
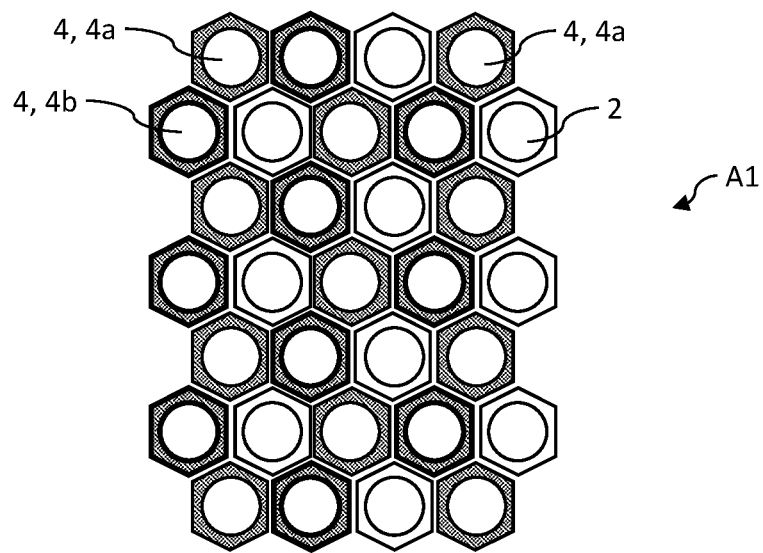
FIG. 6A shows a top view of a further exemplary set of plant containers in a joint structured grid formation, the set comprising first and second plant containers.

As one example of alternative structured grid formations, FIG. 6A shows first and second plant containers 2, 4 in a honeycomb-like joint structured grid formation, the plant containers 2, 4 here having a hexagonal outer shape when viewed from above. In this example the plant containers 2, 4 can equally be considered as arranged at the centers of cells of a hexagonal grid or at the vertices of a triangular grid.

Figure 6B:
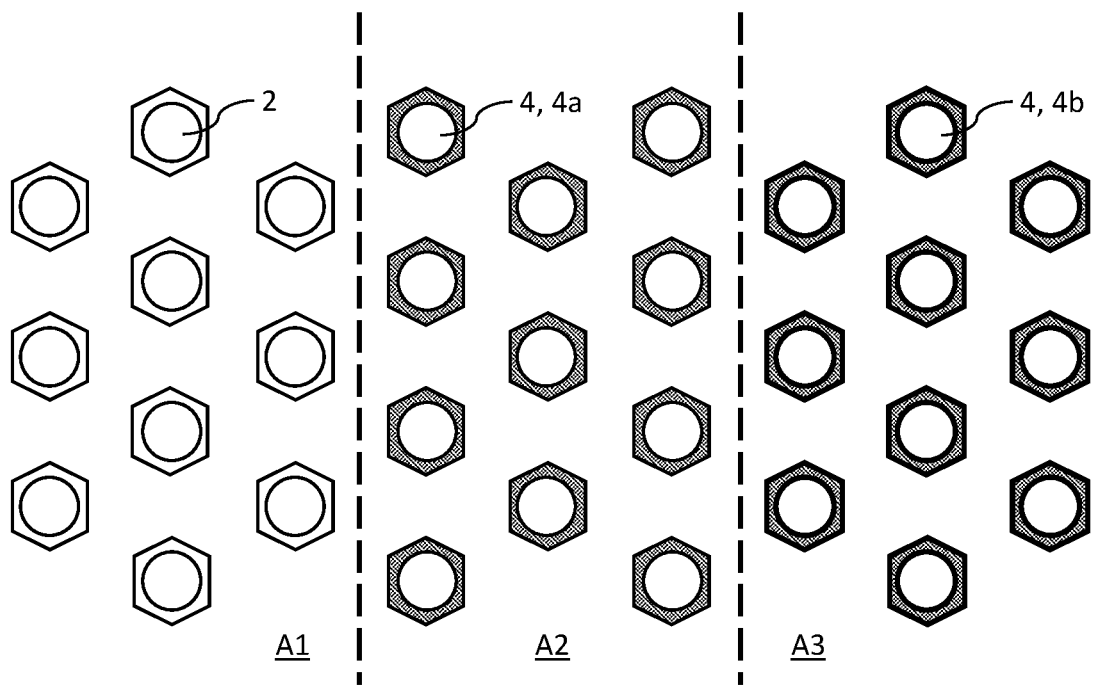
FIG. 6B shows a top view of the set of plant containers of FIG. 6A, wherein interspace among the plant containers has been increased.

In FIG. 6B interspace among these plant containers 2, 4 has been increased as described above, wherein interspace among the second plant containers 4 has subsequently been increased further as described, resulting in respective first and second plant containers 4a, 4b of the second plant containers 4 to be moved away from each other. It will be appreciated that also in this example interspace among the plant containers 2, 4 can be further increased over and over again as described, e.g. if desired depending on plant growth.

Such a method of increasing interspace among plant containers 2, 4 can advantageously be performed as part of an exemplary method of cultivating plants. Such a method of cultivating plants comprises: providing plant containers 2, 4 with cultivatable plant material therein; and increasing interspace among the plant containers 2, 4 as described, in particular after a first period of growth of plants in the containers 2, 4 to facilitate further growth of the plants in the containers 2, 4 during a subsequent period of growth.

As an example, FIG. 5 shows plant containers 2, 4 with plants P1, P2 being cultivated therein, as explained further elsewhere in this description.

FIG. 1B shows an example of a system 6 for cultivating plants, which system can advantageously be employed in the above described methods. The system 6 comprises a set of plant containers 2, 4 which are each suitable for cultivating one or more plants therein, the set comprising first 2 and second 4 plant containers, wherein the first plant containers 2 are configured to be arranged in a first structured grid formation along a horizontal plane and the second plant containers 4 are configured to be arranged in a second structured grid formation along said horizontal plane, such that when viewed from above the first and second plant containers 2, 4 are alternatingly arranged in a joint structured grid formation, wherein the first and second plant containers 2, 4 are configured to enable mutually simultaneous vertical movement between the first plant containers 2 on the one hand and the second plant containers 4 on the other hand.

The system further comprises a separation device 8 configured for mutually simultaneously moving the second plant containers 4 away from the first plant containers 2 in a vertical direction V such that the second plant containers 4 in their second structured grid formation are subsequently placeable in a second area A2 (see FIGS. 2B-C, 6B) while the first plant containers 2 can remain in their first structured grid formation in a first area A1, whereby interspace among the plant containers 2, 4 is increased.

Optionally the separation device 8 is also configured for moving the first plant containers 2 in their first structured grid formation in a vertical direction V, for example after the second plant containers 4 have been moved away from the first plant container 2. In this way, the first plant containers 2 can easily be lifted from a tray 18, for example.

Optionally the separation device 8 is also configured for moving the first and second plant containers 2, 4 in their joint structured grid formation together in a vertical direction V. For example, the first plant containers 2 can be upwardly engaged by the separation device 8 while the second plant containers 4 are retained among the first plant containers 2 (see FIG. 1A). In this way, the first and second plant containers 2, 4 can easily be lifted from a tray 18, for example.

Here the separation device 8 comprises a support frame 14 and push pins 16, as explained further elsewhere in this description.

In an embodiment, the first plant containers 2 are connected, at least connectable, to each other to form the first structured grid formation.

In this way, the first plant containers 2 can be more easily maintained in the first structured grid formation, in particular while moving the first plant containers 2 and/or the second plant containers 4. Also, the first plant containers 2 can thus be moved more easily together, in particular requiring fewer of the first plant containers 2 to be engaged directly.

In an embodiment, the second plant containers 4 are connected, at least connectable, to each other to form the second structured grid formation.

In this way, the second plant containers 4 can be more easily maintained in the second structured grid formation, in particular while moving the first plant containers 2 and/or the second plant containers 4. Also, the second plant containers 4 can thus be moved more easily together, in particular requiring fewer of the second plant containers 4 to be engaged directly.

In an embodiment, the second plant containers 4 are each provided with a respective connecting element 10, 11 which connects, at least is configured to connect, the container 4 to at least one other container 4 in the respective second grid formation, wherein at least one 10 of the connecting elements 10, 11, is engageable by the separation device 8 for moving the second plant containers 4 away from the first plant containers 2.

Here four first connecting elements 10 are engageable by the separation device 8, however a different number of such first connecting elements 10 may be provided. The first connecting elements 10 are here configured to engage with distal ends of push pins 16 of the separation device 8.

The other connecting elements 11 of the second plant containers 4 are here second connecting elements 11 which are configured to provide a passage between the plant containers 4, in particular for an upward flow of ventilation for plants in the containers 4, as explained further elsewhere in this description. Here the second connecting elements 11 are configured to connect the plant containers 4 while maintaining an opening therebetween.

In an embodiment, the first plant containers 2 are each provided with a respective connecting element 10, 11 which connects, at least is configured to connect, the container 2 to at least one other container 2 in the respective first grid formation. Connecting elements 11 of the first plant containers 2 can be configured to provide a passage for the separation device 8 for moving the second plant containers 4 away from the first plant containers 2.

Here the first and second connecting elements 10, 11 of the first plant containers 2 are arranged with respect to the first plant containers 2 essentially the same as how the first and second connecting elements 10, 11 of the second plant containers 4 are arranged with respect to the second plant containers 4. It can be seen in FIG. 1B that the second plant containers 4 and their connecting elements 10, 11 essentially comprise a mirrored arrangement compared to the first plant containers 2 and their connecting elements 10, 11. Highly advantageously, copies of a same plant container assembly 32, 32' can thus interchangeably be used as either first plant containers 2 or second plant containers 4. This promotes ease of use, versatility, and easy manufacturability.

It can be seen from FIG. 1B that in such a configuration, for optionally engaging the first plant containers 2 by the separation device 8, the separation device can first be rotated by 180 degrees about a vertical axis, so that the push pins 16 align with the engageable connecting elements 10 of the first plant containers 2.

Here the passage provided by four of the second connecting elements 11 advantageously serves a dual purpose of providing a passage for a ventilation flow as well as providing a passage for push pins 16 of the separation device 8.

One or more of such connecting elements 10, 11 can be integrally formed with one or more of the respective plant containers 2 and/or 4. Alternatively or additionally one or more of such connecting elements 10, 11 can be selectively connectable to one or more respective plant containers 2, 4, for example using a clamping connection. Such selective connections can advantageously provide modularity of the plant containers 2, 4, thus providing increased versatility of the system 6.

While no connecting elements are shown in other figures besides FIG. 1A-B, it will be appreciated that such connecting elements can be present in the embodiments shown in the other drawings. While FIG. 2A shows the plant containers 2, 4 as forming a closed covering of the first area A1, it will be appreciated that preferably openings for vertical ventilation flows are between the containers 2, 4, for example similar to openings in the second connecting elements 11 in FIG. 1A and/or similar to such openings in line with arrow F in FIG. 5. Alternatively or additionally, parts of the plant containers 2, 4, in particular respective circumferential flanges 13 thereof, may be perforated and/or otherwise configured to be substantially gas transmissive for allowing ventilation flows to pass between the containers 2, 4.

When mutually connected as described, second plant containers 4 can thus be part of a plant container assembly 32 (see FIGS. 1A-B). In such a plant container assembly 32 second plant containers 4 are mutually connected in a second structured grid formation with regular interspacing among the second plant containers 4, wherein the interspacing is dimensioned to reversibly receive therein first plant containers 2 in a vertical direction, which first plant containers 2 are mutually arranged in a first structured grid formation, wherein the assembly 32 is configured such that by said receiving the first and second plant containers 2, 4 are alternatingly arranged in a joint structured grid along a horizontal plane.

It will be appreciated that the first plant containers 2 can similarly be part of a respective plant container assembly 32' when mutually connected as described (see FIGS. 1A-B).

Thus, in an embodiment, the system 6 comprises one or more of such plant container assemblies 32 and/or 32'.

Optionally such plant container assemblies 32, 32' are be mutually connectable and subsequently disconnectable to facilitate joint handling of the assemblies 32, 32'.

In an embodiment, with reference to FIGS. 3A-B at least the second plant containers 4, and optionally the first plant containers 2, each comprise at least one socket 12 which extends upwardly from a bottom 15 of the container 4.

Such a socket 12 can provide additional or alternative means for engagement by the separation device 8. In particular a push pin 16 of the separation device can be inserted in the socket for upwardly engaging the second plant container 4.

It will be appreciated that a plant container, e.g. the plant container 4 as shown in FIGS. 3A-B, preferably comprises one or more drainage openings (not shown) in and/or near a bottom 15 of the container 4.

In an embodiment, the at least one socket 12 and the separation device 8 are configured to engage each other such that the respective plant container 4 is thereby stably positioned with respect to the separation device 8.

Such a configuration enables stable and smooth vertical movement of the second plant containers 4 with respect to the first plant containers 2. Moreover, stable transport and/or placement of plant containers 2, 4 is thus enabled.

In an embodiment, when viewed from above, the at least one socket 12 is arranged substantially symmetrically with respect to a center of mass C of the plant container 4 during use, in particular when the plant container 4 is provided therein with plant material for cultivation.

Such a configuration can advantageously promote stability of the container 4 with respect to the separation device 8.

In a substantially symmetric plant container 4, the center of mass C will generally be positioned centrally with respect to the container, when viewed from above, as shown in FIG. 3A. It will be appreciated that the center of mass can gradually rise as the plant grows in the container 4 and can vary vertically depending on a moisture level in the container 4. Hence the center of mass C has been indicated approximately in FIG. 3B by a vertical line segment C.

In an embodiment, the at least one socket 12 and the separation device 8 are configured to form a mutual clamping connection, in particular between the socket 12 and a push pin 16 of the separation device 8.

Such a clamping connection can advantageously promote stability of the plant container 4 with respect to the separation device 8. To facilitate formation of such a clamping formation, the socket 12 may be tapered towards an upper end thereof as shown in FIG. 3B. Alternatively or additionally the separation device 8, in particular the push pin 16, may be provided with an active, e.g. controlled, clamping means.

In an embodiment, as shown in FIG. 1B, the separation device 8 comprises a support frame 14 with upwardly directed push pins 16 configured for pushing the second plant containers 4 upwardly away from the first plant containers 2.

Such a separation device 8 can upwardly engage the second plant containers 4 for example upwardly through support surface (not shown in FIG. 1B) which comprises the first area A1 and which provides passages for the push pins 16. The push pins 16 can engage the second plant containers 4, e.g. by respective first connecting elements 10 and/or respective sockets 12, in particular substantially without engaging the first plant containers 2, for example moving through passages provided by second connecting elements 11 of the first plant containers 2, as shown in FIG. 1B.

While FIG. 1B shows a separation device 8 with four push pins 16, it will be appreciated that a different number of push pins can be provided. The push pins 16 can advantageously be distributed along a surface area and/or a circumference of the second structured grid formation for smooth and stable engagement of the second plant containers 4.

In an embodiment, as alluded to elsewhere in this description, each of the push pins 16 are configured to enter a respective one of the at least one socket 12 to push the respective second plant container 4 upwardly away from the first plant containers 2.

While the first connecting element 10 and/or socket 12 have been described as enabling the second plant containers 4 to be moved away from the first plant containers 2 in the vertical direction, such connecting elements 10 and/or sockets 12, for example in the second plant containers 4 and/or the first plant containers 2, can also advantageously enable more general handling of the first and/or second plant containers 2 and/or 4, e.g. for moving the plant containers 2 and/or 4 between different areas, in particular substantially simultaneously in a respective structured grid formation. In particular such a connecting element 10 and/or socket 12 can advantageously enable engagement of the respective plant container 2 and/or 4 by a device such as a separation device 8, a placement device 24 and/or another device.

Similarly, while the separation device 8 and the push pins 16 have been described as enabling the second plant containers 4 to be moved away from the first plant containers 2 in the vertical direction, such a separation device 8 and/or such push pins 16 can also advantageously enable more general handling of the first and/or second plant containers 2 and/or 4, e.g. for moving the plant containers 2 and/or 4 between different areas, in particular substantially simultaneously in a respective structured grid formation. In particular such push pins 16 can advantageously enable engagement of respective plant containers 2 and/or 4 by respective engageable connecting elements 10 and/or sockets 12.

In an embodiment, the system 16 comprises a tray 18 (see FIGS. 4 and 5) with a bottom 20 which extends in the horizontal plane, the tray 18 being configured for receiving the first and second plant containers 2, 4 thereon in the joint structured grid formation, wherein the bottom 20 of the tray 18 has holes 22 for engaging one or more received plant containers 2 and/or 4 therethrough.

In this way the tray 18 can support the first and second plant containers 2, 4 in their joint structured grid formation in the first area A1 (the tray 18 e.g. providing the first area A1), while enabling upward engagement of the second plant containers 4 by moving the push pins 16 of the separation device 8 upwardly through the holes 22 while the support frame 14 of the separation device 8 is below the tray 18.

It will be appreciated that such a tray 18 can advantageously similarly be provided in the second area A2 and/or in one or more further areas A3, A4.

As shown in FIG. 4, preferably the holes 22 are each provided with a respective open-ended pipe section 25 which extends upwardly from the bottom 20 and which is configured to prevent leakage of fluids from the tray 18 through the holes 22. While the drawings show the pipe sections 25 as having a substantially width along their vertical length, more preferably the pipe sections are tapered towards their distal or upper ends, e.g. having a substantially frustoconical shape, to promote self-centering of the plant containers 2, 4 as they are received on the tray 18. Instead of having a cylindrical shape as shown, such a pipe section 25 can have a non-circular, e.g. rectangular transversal profile. In any case, as shown, said pipe section preferably forms a circumferential dam structure around the opening 22. Preferably a height of the pipe section corresponds to or exceeds a maximum liquid level in the tray 18 during use, in particular substantially without blocking space for receiving the plant containers on the tray 18.

In an embodiment, at least some of the holes 22 are arranged in alignment with at least some of the first connecting elements 10 when the first and second plant containers 2, 4 are received on the tray 18 in the joint structured grid formation.

Such a configuration enables that the first connecting elements 10 can be upwardly engaged through the tray 18, in particular with respect to the tray 18 on which the first plant containers 2 can remain.

It will be appreciated that thus as one example the tray 18 with the first plant containers 2 thereon may be moved down, e.g. dropped, while the first connecting elements 10 substantially remain at the same vertical level.

In an embodiment, at least some of the holes 22 are arranged in alignment with the at least one socket 12 of the second plant containers 4 when the first and second plant containers 2, 4 are received on the tray 18 in the joint structured grid formation.

Such a configuration enables that the socket 12 can be upwardly engaged through the tray 18, in particular with respect to the tray 18 on which the first plant containers 2 can remain.

It will be appreciated that thus as one example the tray 18 with the first plant containers 2 thereon may be moved down, e.g. dropped, while the sockets 12 substantially remain at the same vertical level.

In an embodiment, at least some of the holes 22 are arranged for guiding therethrough an upward ventilation flow F (see FIG. 5) from beneath the tray 18 to plants in the plant containers 2, 4 received on the tray 18 during cultivation. The upward ventilation flow F is discussed in more detail elsewhere in this description.

In an embodiment, the tray 18 is configured for guiding an irrigation flow, drainage flow and/or nutrient flow along plants in the plant containers 2, 4 during cultivation, wherein the tray 18 is configured to prevent such a flow from leaking through one or more of the holes 22.

As explained elsewhere in this description, the holes 22 can to that end be provided with upwardly extending pipe sections which inhibit such leakage, in particular while at the same time allowing the upward ventilation flow and/or upward passage of push pins 16 through the holes.

In particular the tray 18 may be configured as a so-called ebb-and-flow tray, flood tray or flood-and-drain tray, enabling a flow of liquid along the bottom 20 of the tray 18 such that a liquid level in the tray 18 first rises and subsequently falls, in particular for intermittently and/or cyclically hydrating, draining and/or feeding plants in the containers 2, 4 in the tray 18. Ebb-and-flow trays or flood-and-drain trays are known as such and can advantageously be combined with a system for plant cultivation according to the present invention.

As shown in FIG. 4, the tray 18, in particular the bottom 20, can comprise one or more drainage channels 23 for draining liquid along the bottom 20 and/or one or more drainage outlets 21 for guiding liquid out of the tray e.g. under influence of gravity. Such a drainage outlet 21 is preferably configured, e.g. dimensioned, to provide a flow resistance for the drainage of liquid, thereby enabling a so-called ebb-and-flow or flood-and-drain method of plant irrigation and/or feeding, which is known as such and can advantageously be combined with a plant cultivation method according to the present invention.

In an embodiment, with reference to FIG. 1B, the system 6 comprises a placement device 24 for placing the second plant containers 4 in their second structured grid formation in the second area A2 after the second plant containers 4 have been moved away from the first plant containers 2 using the separation device 8.

As shown, the placement device 24 can comprise a fork structure 24 with prongs 27 that can be moved horizontally and optionally also vertically under upwardly engageable structures, e.g. bottoms 15, circumferential flanges 13 and/or connecting elements 10 and/or 11, of the second plant containers 4. While FIG. 1B shows two such prongs 27, it will be appreciated that a different number of prongs 27 can be provided.

The placement device 24 can advantageously comprise a motorized arm (not shown), e.g. a robot arm, for automatically or semi-automatically moving the fork structure 24 to engage and subsequently move and disengage the second plant containers 4 for placing the second plant containers 4 in the second area A2. The placement device 24 can additionally be used to move other plant containers such as the first plant containers 2 between different areas.

In an embodiment, the system 6 comprises a support structure 26 (see FIG. 5) for supporting plant containers 2, 4 on multiple vertical levels L1, L2 above each other.

Such a support structure 26 can advantageously enable so called vertical farming. Examples of such a support structure 26 are known as such and can advantageously be combined with a system 6 according to the present invention. The support structure 26 can be mobile, e.g. being provided with wheels for transportation. For example, the support structure 26 can comprise, or be part of, a so-called Danish trolley.

In an embodiment, the multiple vertical levels L1, L2 comprise a first vertical level L1 and a second vertical level L2 above the first vertical level L1, wherein at least on the second vertical level L2 plant containers 2,4, for example first and/or second plant containers 2 and/or 4, are arranged in a structured grid formation on the tray 18.

In an embodiment, the system 6 comprises a heat generating light source 28 arranged between the first and second vertical levels L1, L2, the light source 28 being configured to illuminate plants on the first vertical level L1.

Such a heat generating light source 28, e.g. comprising light emitting diodes (LEDs), is known as such for use in vertical farming and can advantageously be combined with a system 6 according to the present invention. The light source 28 is preferably configured to emit light at one or more wavelengths which stimulate plant growth, for example comprising red and/or blue wavelengths.

In an embodiment, the system 6 is configured to allow gas to be heated by the light source L1 such that by convection the heated gas is subsequently driven upward as a ventilation flow F through the holes 22 in the tray 18 to provide ventilation for plants in the plant containers 2,4 at the second vertical level L2.

To that end preferably the support structure 26 is configured to allow such an upward flow, e.g. comprising gas transmissive openings in a section of the support structure 26 which section extends between the light source 28 and the tray 18. At the same time said section is preferably configured to stably support the weight of the tray 18 with respective plant containers 2, 4, plants P1, P2 and irrigation flows. For example, said section can comprise a relatively open metal mesh and/or a perforated plate. Alternatively or additionally, said section can comprise rails on which the tray 18 can be e.g. slidingly received, wherein a space between the rails is substantially open to allow the upward flow of gas.

In a further explanation of one or more aspects of the present invention, FIG. 5 shows an exemplary system 6 for cultivating plants, comprising a support structure 26 for supporting plant containers 2, 4 on multiple vertical levels L1, L2 above each other, the multiple vertical levels L1, L2 comprising a first vertical level L1 and a second vertical level L2 above the first vertical level L1.

The support structure 26 is configured to allow an upward flow F of gas within outer bounds of the support structure 26 from the first vertical level L1 to the second vertical level L2.

The exemplary system 6 comprises a heat generating light source 28 arranged within the outer bounds between the first and second vertical levels L1, L2, the light source 28 being configured to illuminate plants on at least the first vertical level L1.

The exemplary system 6 is configured to allow gas at the light source 28 to be heated by the light source 28 such that by convection the heated gas is subsequently driven upward to the second vertical level L2, the gas thereby forming a ventilation flow F for plants which are arranged at the second vertical level L2.

In an embodiment, the system 6 comprises gas supply means 30 for actively supplying a gas or gas mixture at the light source 28 and/or between the light source 28 and the second vertical level L2.

Such gas supply means 30 can be realized in various ways. In the example of FIG. 5, the gas supply means 30 comprises horizontal gas outlets 30 directed into a space between the light source 28 and the second vertical level L2. Alternatively or additionally, the gas supply means 30 can comprise a gas permeable membrane and/or perforated wall (not shown) which e.g. extends along the light source 28, e.g. in the form of a hose or other duct, wherein the gas is supplied through said membrane and/or perforated wall. It will be appreciated that the gas supply means 30 can comprise one or more ducts, e.g. hoses, for guiding the gas to be supplied towards the area where it is to be supplied.

Preferably the gas or gas mixture supplied by the gas supply means 30 comprises at least 1% carbon dioxide, preferably at least 2% carbon dioxide, more preferably at least 5% carbon dioxide, more preferably at least 20% carbon dioxide, more preferably at least 50% carbon dioxide, more preferably at least 90% carbon dioxide, for example about 100% carbon dioxide.

Such a composition of the gas or gas mixture can advantageously promote plant growth when the gas or gas mixture is brought in contact with plants, in particular after having been mixed with ambient gas to achieve a concentration of carbon dioxide at the plants which concentration is advantageous for plant growth. Optional regulation of said concentration at the plants is explained elsewhere in this description.

Optionally the gas or gas mixture supplied by the gas supply means 30 is a heated or cooled gas or gas mixture, e.g. having a different temperature compared to an ambient temperature at the area where it is supplied, e.g. depending on heating and/or cooling needs for the plants.

Optionally, the gas or gas mixture supplied by the gas supply means 30 comprises and/or carries water, e.g. gaseous water and/or small droplets of liquid water, for humidification of the plants. A humidity of said gas or gas mixture can be higher than an ambient humidity at the plants. Such humidity can advantageously promote plant growth, in particular during germination of seeds and/or rooting of cuttings.

Optionally the gas or gas mixture supplied by the gas supply means 30 is a dried and/or dry gas or gas mixture, e.g. having a relatively low humidity compared to an ambient humidity at the plants, in particular for reducing ambient humidity at the plants.

The gas supply means 30 can comprise a controller (not shown) to regulate one or more aspects of the gas supply, in particular depending on one or more sensor inputs regarding aspects to be regulated.

For example the controller may be configured to regulate the carbon dioxide concentration at the plants to within a predetermined range of for example 500 ppm (parts per million) to 1500 ppm, preferably a range of 800 ppm to 1200 ppm, for example a relatively narrow range around about 1000 ppm. To that end the controller may be provided with one or more sensors for sensing carbon dioxide concentration at the plants. The controller is preferably configured to regulate the carbon dioxide concentration together with, e.g. in dependence of, a temperature and/or light level at the plants, for example a measured and/or set temperature and/or light level. To that end the controller may be provided with one or more temperature sensors and/or light level sensors.

Additionally or alternatively said controller may be configured to regulate one or more other aspects of the gas supply and/or its effects on the plants, for example regarding humidity and/or temperature. To that end the controller may be provided with one or more respective sensors, e.g. humidity sensors and/or temperature sensors for sensing respective conditions at the plants.

Such a controller of the gas supply means 30 may be part of and/or operatively connected to another controller which is configured for regulating growing conditions of the plants, e.g. a more general plant cultivation controller and/or a light controller and/or a heating controller.

In this way, the system 6 can promote good growing conditions for plants while the plants can be placed relatively closely together. In particular a boundary layer which surrounds leaves of the plants can thus be managed well to promote plant growth and health.

As shown in FIG. 5, the system 6 may comprise e.g. a further light source 28' for illuminating the second plants P2 and/or a further gas supply means 30' for supplying gas to, e.g. below, the first plants P1.

It will be appreciated that highly advantageously further vertical levels can similarly be provided above and/or below the presently shown one first and one second vertical levels L1, L2, wherein the multiple vertical levels thus comprise multiple first vertical levels L1 and/or multiple second vertical levels L2. In particular subsequent pairs of first and second vertical levels L1, L2 can be provided, wherein a second vertical level L2 of one pair of levels provides a first vertical level of a subsequent higher pair of levels. The system, in particular the support structure 26, preferably provides at least three such vertical levels for cultivating plants, more preferably at least four, more preferably at least five, for example about twelve levels.

Optionally, the system 6 is configured to remove heat from one or more of the multiple vertical levels, in particular from higher levels thereof, in order to prevent overheating of plants at said levels. For example, the system 6 to that end is provided with further gas supply means (not shown) which are configured to supply relatively cool air at said levels.

In an exemplary use of the system 6, plants with a higher preferred cultivation temperature are cultivated at one or more higher levels of the multiple vertical levels, while plants with a lower preferred cultivation temperature are contemporaneously cultivated at one or more lower levels of the multiple vertical levels.

In this way, heat accumulating at the higher levels by the described upward convection flow can advantageously be utilized in the cultivation of plants which prefer a higher temperature, for example basil.

In an embodiment, the system 6 further comprises a tray 18 for receiving plant containers 2, 4 thereon, the tray 18 with the plant containers 2, 4 thereon being placeable on the support structure 26 at one of the multiple vertical levels L1, L2. The tray 18 has a bottom 20 which is upwardly gas transmissive for allowing an upward ventilation flow between the plant containers 2, 4 therethrough. The tray 18 is configured for guiding a liquid flow along the bottom 20 for irrigation and/or drainage and/or feeding of plants in the plant containers 2, 4.

Such a tray 18 is explained further elsewhere in this description. Such a tray 18 advantageously enables efficient handling of plant containers 2, 4 on one of the vertical levels L1, L2 while at the same time facilitating good growing conditions for plants P1, P2 in the containers 2, 4.

With reference to FIG. 5, an exemplary method of cultivating plants comprises: cultivating a first plant P1 on a first vertical level L1; cultivating a second plant P2 above the first plant P1 on a second vertical level L2; providing a heat generating light source 28 at an intermediate position IP which is beneath the second plant P2 and above and/or to the side of the first plant P1; illuminating the first plant P1 using the heat generating light source 28, thereby heating a gas at the intermediate position IP; and allowing the heated gas to rise to the second vertical level L2 and upwardly along the second plant P2 by convection, thereby ventilating the second plant P2.

Optionally the method comprises actively supplying a gas or gas mixture at the intermediate position IP and/or between the intermediate position IP and the second plant.

As indicated above, the supplied gas or gas mixture can for example be relatively warm, relatively cold, relatively humid and/or relatively dry compared to ambient conditions at the plants, in particular the second plant P2, for respectively influencing said conditions at said plant.

The present description further discloses a plant P1, P2 cultivated by a method as described herein, and/or using a system 6 as described herein. As will be appreciated in view of the descriptions of the systems and methods, such a plant P1, P2 can be cultivated particularly efficiently and/or with particularly good quality, wherein in particular good ventilation of the plants can be provided throughout subsequent growth stages of the plants P1, P2.

Plants with a relatively small height can be particularly suitable for cultivation on multiple levels above each other as described. Examples of plants that can advantageously be cultivated in this way include but are not limited to: herbs such as basil, bay, chives, dill, mint, oregano, rosemary, thyme; lettuces, leafy greens, micro greens, cresses, spinach, rocket; medicinal herbs; and medicinal and/or recreational *cannabis*; ornamental plants; among other plants.

While the invention has been explained using exemplary embodiments and drawings, these are not to be construed as limiting the scope of the invention, which scope is provided by the claims. Many variations, combinations and extensions are possible, as will be appreciated by the skilled person. For example, different containers can hold different plants. A plant cultivated using the invention can be consumable or not consumable. A method according to the invention can be performed with or without using a system according to the invention. Plants can be cultivated indoors and/or outdoors, for example using sunlight, solar heat, either directly and/or indirectly, e.g. using a solar panel and/or solar collector. Plant containers can have many different colors, shapes, and sizes. Plant containers can be moved manually and/or automatically. Plants can be ventilated at least partially from above and/or from the side. Interspace among plant containers can be increased by other means and/or by other methods than those described, e.g. manually or automatically using conventional means and/or methods. Further examples have been provided throughout the description.

The invention claimed is:

1. A method of increasing interspace among plant containers comprising:
   providing a set of plant containers, the set comprising first modular plant containers and second modular plant containers;
   arranging and connecting, via a first set of selectively connectable clamping connection elements, the first plant containers to each other in a first structured grid formation along a horizontal plane;

arranging and connecting, via a second set of selectively connectable clamping connection elements, the second plant containers to each other in a second structured grid formation along said horizontal plane, whereby, when viewed from above, the first and second plant containers are alternatingly arranged in a joint structured grid formation in a first area; and for increasing the interspace among the plant containers, mutually simultaneously moving the second plant containers in their second grid formation away from the first plant containers in a vertical direction; and subsequently placing the second plant containers in a second area.

2. The method according to claim 1, further comprising:

after said step of placing the second plant containers in the second area, redesignating the first plant containers and/or the second plant containers together as a set of plant containers which set includes redesignated first plant containers and redesignated second plant containers arranged respectively in a first structured grid and a second structured grid along a common horizontal plane, wherein, when viewed from above, the redesignated first plant containers and redesignated second plant containers are alternatingly arranged in a joint structured grid formation in a respective first area;

moving the redesignated second plant containers in their respective second grid formation away from the first plant containers and/or redesignated first plant containers in a vertical direction; and subsequently placing the second redesignated plant containers in a respective second area so as to further increase the interspace among the first plant containers and/or the redesignated first plant containers and the redesignated second plant containers.

3. A system for cultivating plants, comprising:

a set of plant containers which are each suitable for cultivating one or more plants therein, the set of plant containers comprising, a first plurality of plant containers that are modular and configured to be selectively connected to each other via selectively connectable first clamping connection elements and arranged in a first structured grid formation along a horizontal plane, and a second plurality of plant containers that are modular and configured to be selectively connected to each other via selectively connectable second clamping connection elements and arranged in a second structured grid formation along said horizontal plane, such that, when viewed from above, the first and second plurality of plant containers are alternatingly arranged in a joint structured grid formation, wherein the first and second plurality of plant containers are configured to enable mutually simultaneous vertical movement between the first plurality of plant containers and the second plurality of plant containers; and a separation device configured for mutually simultaneously moving the second plurality of plant containers away from the first plurality of plant containers in a vertical direction such that the second plurality of plant containers in their second structured grid formation are subsequently placeable in a second area while the first plurality of plant containers remain in their first structured grid formation in a first area, whereby interspace among the first and second plurality of plant containers is increased.

4. The system according to claim 3, wherein at least one of the connecting elements of the second plurality of plant containers is engageable by the separation device for moving the second plurality of plant containers away from the first plurality of plant containers.

5. The system according to claim 4, wherein at least the second plurality of plant containers each comprise at least one socket which extends upwardly from a bottom of the container.

6. The system according to claim 5, wherein the at least one socket and the separation device are configured to engage each other such that the respective plant container is thereby stably positioned with respect to the separation device.

7. The system according to claim 6, wherein when viewed from above the at least one socket is arranged substantially symmetrically with respect to a center of mass of the plant container during use, in particular when the plant container is provided therein with plant material for cultivation.

8. The system according to claim 7, wherein the at least one socket and the separation device are configured to form a mutual clamping connection.

9. The system according to claim 8, wherein the separation device comprises a support frame with upwardly directed push pins configured for pushing the second plurality of plant containers upwardly away from the first plurality of plant containers.

10. The system according to claim 9, wherein each of the push pins are configured to enter a respective one of the at least one socket to push the respective second plurality of plant container upwardly away from the first plurality of plant containers.

11. The system according to claim 10, comprising a tray with a bottom which extends in the horizontal plane, the tray being configured for receiving the first and second plurality of plant containers thereon in the joint structured grid formation, wherein the bottom of the tray has holes for engaging one or more of the received first and second plurality of plant containers therethrough.

12. The system according to claim 11, wherein at least some of the holes are arranged in alignment with at least some of the connecting elements when the first and second plurality of plant containers are received on the tray in the joint structured grid formation.

13. The system according to claim 12, wherein at least some of the holes are arranged in alignment with the at least one socket of the second plurality of plant containers when the first and second plurality of plant containers are received on the tray in the joint structured grid formation.

14. The system according to claim 13, wherein at least some of the holes are arranged for guiding therethrough an upward ventilation flow from beneath the tray to plants in the first and second plurality of plant containers received on the tray during cultivation.

15. The system according to any of claim 14, wherein the tray is configured for guiding an irrigation flow, drainage flow and/or nutrient flow along plants in the first and second plurality of plant containers during cultivation, wherein the tray is configured to prevent such a flow from leaking through one or more of the holes.

16. The system according to any of claim 15, comprising a placement device for placing the second plurality of plant containers in their second structured grid formation in the second area after the second plurality of plant containers have been moved away from the first plurality of plant containers using the separation device.

17. The system according to any of claim 16, comprising a support structure for supporting the first and second plurality of plant containers on multiple vertical levels above each other.

18. The system according to claim 17,
wherein the multiple vertical levels comprise,
a first vertical level, and
a second vertical level above the first vertical level, wherein at least on the second vertical level the first and second plurality of plant containers are arranged in a structured grid formation on the tray,
wherein the system comprises,
a heat generating light source arranged between the first and second vertical levels, the light source being configured to illuminate plants on the first vertical level, and
wherein the system is configured to allow gas to be heated by the light source such that by convection the heated gas is subsequently driven upward as a ventilation flow through the holes in the tray to provide ventilation for plants in the first and second plurality of plant containers at the second vertical level.

19. A method of increasing interspace among plant containers comprising:

providing a set of plant containers, the set comprising first modular plant containers and second modular plant containers;

arranging and connecting, via a first set of selectively connectable clamping connection elements, the first plant containers to each other in a first structured grid formation along a horizontal plane;

arranging and connecting, via a second set of selectively connectable clamping connection elements, the second plant containers to each other in a second structured grid formation along said horizontal plane, whereby when viewed from above the first and second plant containers are alternatingly arranged in a joint structured grid formation in a first area;

for increasing the interspace among the plant containers, mutually simultaneously moving the second plant containers in their second grid formation away from the first plant containers in a vertical direction, and
subsequently placing the second plant containers in a second area; and supporting the second plant containers in the second area by aligning push pins with a plurality of engageable connecting elements of the first and second sets of selectively connectable connecting elements.

* * * * *